United States Patent [19]

Arter

[11] 4,439,665
[45] Mar. 27, 1984

[54] ARC WELDING APPARATUS HAVING PIVOTABLY MOUNTED ELECTRODE CARRIAGE

[75] Inventor: William L. Arter, Fullerton, Calif.

[73] Assignee: Jetline Engineering, Inc., Irvine, Calif.

[21] Appl. No.: 372,195

[22] Filed: Apr. 26, 1982

[51] Int. Cl.³ .............................................. B23K 9/12
[52] U.S. Cl. .......................... 219/124.02; 219/124.34; 219/136
[58] Field of Search ...................... 219/124.01, 124.02, 219/124.03, 124.1, 124.34, 124.4, 136

[56] References Cited

U.S. PATENT DOCUMENTS 4,284,871 8/1981 Mawson et al. .................. 219/124.1
4,333,052 6/1982 Schmall ......................... 219/124.34

FOREIGN PATENT DOCUMENTS 335055 5/1972 U.S.S.R. ......................... 219/124.02

Primary Examiner—C. C. Shaw
Attorney, Agent, or Firm—Jackson, Jones & Price

[57] ABSTRACT

An arc welding apparatus is disclosed wherein an electrode carriage is mounted to occupy two positions relative to a lead screw-threaded sleeve assembly which carries the electrode carriage toward or away from a workpiece. Direction of lineal movement of the lead screw-threaded sleeve assembly is determined by the direction of rotation of a motor which rotates the lead screw. The electrode carriage is moved from its first position relative to the lead screw-threaded sleeve assembly to its second position substantially simultaneously with the contact of the electrode with the workpiece. An electric switch is operatively associated with the electrode carriage to be tripped when the electrode carriage moves from the first position to the second position. Tripping of the switch causes a control unit to reverse rotation of the motor for a predetermined time whereby the electrode is carried to be a predetermined distance from the workpiece.

16 Claims, 5 Drawing Figures

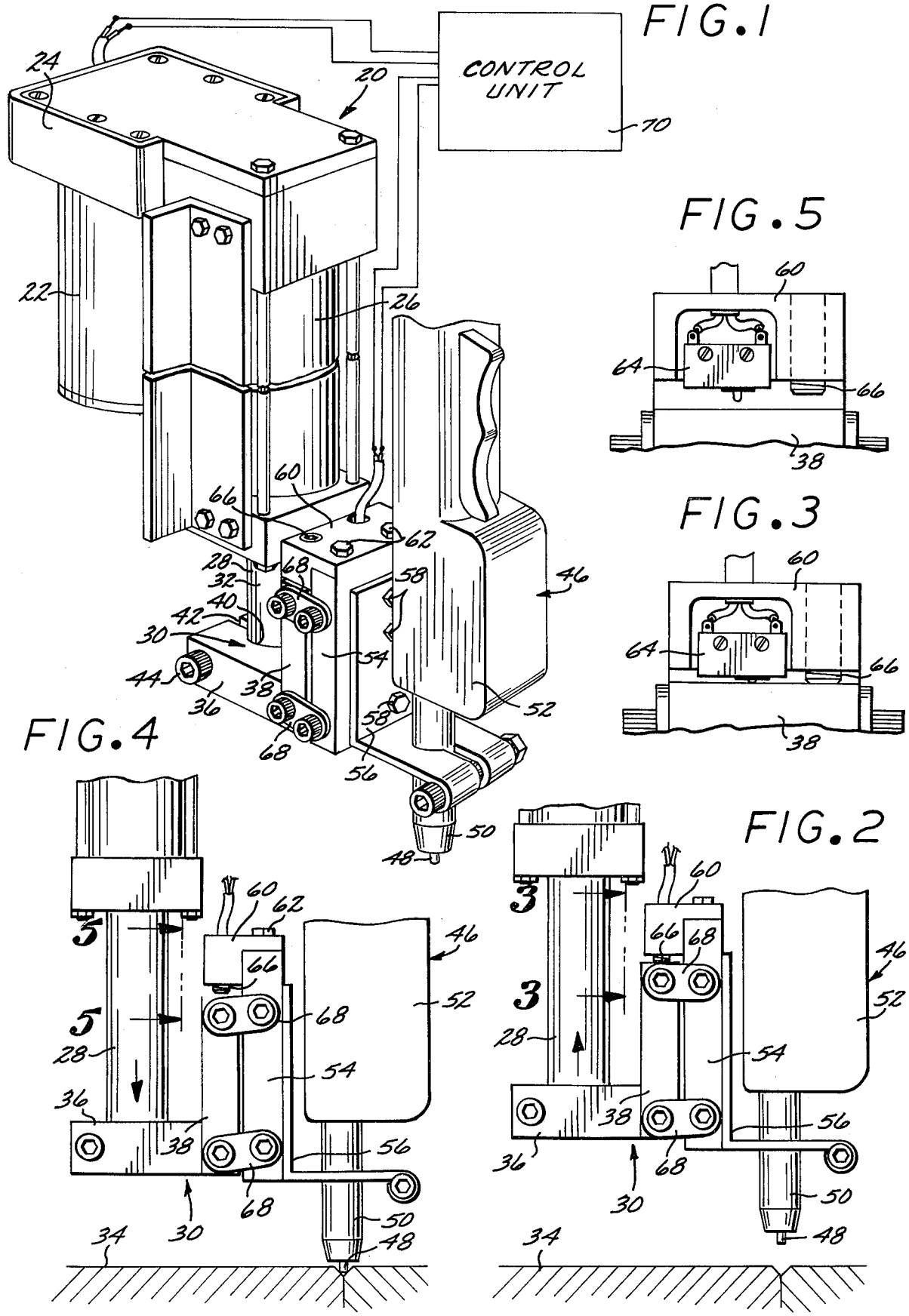

ARC WELDING APPARATUS HAVING PIVOTABLY MOUNTED ELECTRODE CARRIAGE

BACKGROUND OF THE INVENTION

1. Field of the Invention

The present invention is directed to an arc welding apparatus. More particularly, the present invention is directed to an improved arc welding apparatus of the type wherein physical contact of a welding electrode with a work surface is mechanically sensed.

2. Brief Description of the Prior Art

Arc welding apparatus are well known in the prior art. As is well appreciated by those skilled in the art, during a welding operation the welding electrode must be at a predetermined distance from the work surface. This distance is usually determined principally on the basis of the nature of the electrode, the workpiece, the intensity of the electric arc employed for the welding, and the nature of the desired weld.

In order to position the electrode at the desired predetermined distance from the work surface (set in advance by an operator), welding apparatus of the prior art usually employ a lead screw actuated mounting assembly or carriage for the electrode. The lead screw is rotated by an electric motor and, depending on the direction of rotation of the motor, a threaded sleeve mounted to the lead screw carries the electrode towards or away from the work surface.

Because it is important to establish a reference point regarding the location of the electrode relative to the workpiece, the electrical resistance or impedance between the electrode and the workpiece is monitored in the prior art. The electrode is considered to be at zero distance from the workpiece when the monitored resistance or impedance falls below a predetermined threshold value. When this occurs, an electronic control unit causes the electric motor to reverse to carry the electrode away from the workpiece to a predetermined distance.

The above-noted prior art device and method for establishing contact of the electrode with the workpiece, however, suffers from the following disadvantage. When the surface of the workpiece is corroded, rusty or unclean, a relatively large electric resistance or impedance may exist between the electrode and the workpiece. In such a case the prior art "resistance or impedance monitoring" device does not "sense" the physical contact of the electrode with the workpiece, and the electric motor may continue to attempt to drive the lead screw actuated carriage assembly further towards the workpiece.

An improved arc welding device which overcomes the above-noted disadvantage of the formerly-mentioned prior art arc welding devices is described in a copending application for U.S. patent, titled "Arc Welding Apparatus," having Ser. No. 372,193 filed Apr. 26, 1982. The device described in the copending application operates on the principle that an electric switch operatively associated with a carriage assembly bearing the electrode is mechanically tripped substantially in the instance when the electrode physically contacts the workpiece. Tripping of the switch, then, causes the electric motor to reverse rotation for a predetermined time period whereby the electrode is carried to a predetermined distance from the workpiece.

Specific construction of this device involves a lead screw which is mounted in a housing for rotation and for limited upward sliding movement relative to the housing. The upward sliding movement occurs, however, only when the lead screw actuated carriage is in the process of moving towards the workpiece and further movement of the electrode (and therefore of the carriage) is impossible bcause of physical contact of the electrode with the workpiece.

Although the apparatus described in the above-noted copending application works well, further improvements are desirable in its specific construction to render the apparatus even more reliable of operation and economical or manufacture. The present invention is such an improvement.

SUMMARY OF THE INVENTION

It is an object of the present invention to provide an improved arc welding apparatus of reliable operation and relatively economical manufacture wherein physical contact between a welding electrode and a workpiece is mechanically sensed prior to initiation of a welding arc.

This and other objects and advantages are attained by an arc welding apparatus having a motor capable of providing a rotational power output in either direction. The motor is connected with a translatory motion device to drive the same in a lineal motion either towards or away from a workpiece depending on the direction of the rotational power output of the motor. A carriage for a welding electrode is mounted to the translatory motion device to occupy two possible positions relative thereto. An electric switch comprising a part of an electronic control unit is operatively associated with the carriage and the translatory motion device to be tripped when the carriage is moved from a first position into a second position. The carriage normally occupies the first position and is moved into the second position when, on its way toward the workpiece, the electrode physically contacts the workpiece. Tripping of the switch sends an appropriate signal to the control unit to reverse the rotational power output of the motor for a predetermined time whereby the welding electrode is carried to a predetermined distance from the workpiece.

The features of the present invention can be best understood together with further objects and advantages by reference to the following description, taken in connection with the accompanying drawings, wherein like numerals indicate like parts.

BRIEF DESCRIPTION OF THE DRAWINGS

FIG. 1 is a perspective view of a preferred embodiment of the arc welding apparatus of the present invention, a substantially conventional mounting assembly for the apparatus not being shown in the view;

FIG. 2 is a partial side view of the welding apparatus of the present invention showing an electrode carriage assembly in a first position wherein the electrode is not in contact with a workpiece;

FIG. 3 is another partial side view showing the apparatus in the first position;

FIG. 4 is a partial side view of the welding apparatus of the present invention showing an electrode carriage assembly in a second position wherein the electrode contacts the workpiece, and FIG. 5 is another partial side view showing the apparatus in the second position.

DESCRIPTION OF THE PREFERRED EMBODIMENT

The following specification taken in conjunction with the drawings sets forth the preferred embodiment of the present invention. The embodiment of the invention disclosed herein is the best mode contemplated by the inventor by carrying out his invention in a commercial environment, although it should be understood that various modifications can be accomplished within the parameters of the present invention.

Referring now to the drawing figures, and particularly to the perspective view of FIG. 1, a preferred embodiment of the improved arc welding apparatus 20 of the present invention is disclosed. It should be noted at the outset that the arc welding apparatus 20 of the present invention has many common features and components with prior art welding apparatus. The common features and components are described in the ensuing specification only to the extent necessary for explaining and illuminating the present invention. In addition, several components of the arc welding apparatus 20 of the present invention are described and illustrated in the above-noted copending application titled "Arc Welding Apparatus," the specification of which is hereby expressly incorporated by reference.

Referring back again to the drawing figures, the welding apparatus 20 is shown to include an electric motor 22 mounted in a suitable housing 24. The motor 22 is capable of providing a rotational power output in either direction, to drive a substantially conventional lead screw-threaded tube or sleeve assembly 26. The lead screw-threaded sleeve assembly 26, which in combination with the motor is sometimes referred to in the art as "electric cylinder," converts rotary motion of the electric motor 22 to lineal or translatory motion of the threaded sleeve 28. The direction of movement of the threaded sleeve 28 is dependent on the direction of rotation of the motor 22. It is sufficient to emphasize for the purposes of the present invention, that a mounting bracket 30 is affixed to a lower protruding portion 32 of the threaded sleeve 28. Thus the mounting bracket 30, being carried by the "electric cylinder" 26, moves lineally "up" and "down" or "towards" and "away from" a workpiece 34.

As is shown in FIGS. 1, 2 and 4, the mounting bracket 30 is a substantially L-shaped bracket including a substantially horizontally disposed plate 36 and a substantially vertically disposed plate 38. The horizontal plate 36 of the mounting bracket 30 incorporates a substantially circular aperture 40, a slot 42, a threaded hole (not shown) having an axis substantially at a right angle to the slot 42, and a bolt 44 fitting the threaded hole (not shown). The bracket 30 is thus mounted to the lower portion 32 of the sleeve 28 by tightening the bolt 44.

The vertical plate 38 of the mounting bracket 30 supports an electrode-carrying device or electrode carriage assembly 46 which moves and cooperates, in the hereinafter-described manner, with the electric cylinder 26 to position an electrode 48 relative to the workpiece 34. As it was discussed in the introductory section of the present application for patent, the principal purpose of the herein-described welding apparatus 20 is to position the electrode 48 at a predetermined distance from the workpiece 34. The predetermined distance is designed to be optimal for generating an electric welding arc taking the nature of the electrode 48, the workpiece 34 and the qualities of the desired weld into consideration.

The electrode 48 used in conjunction with the welding apparatus 20 of the present invention, is conventional. Those skilled in the art will appreciate that in the context of the present description the term "electrode" may include an appropriate gas discharge tube 50, and an appropriate, substantially conventional electrode support assembly 52. The electrode 48 is coaxially mounted substantially in the center of the gas discharge tube 50. The purpose of the gas discharge tube 50 is to emit argon or like inert gas to protect the weld from the oxygen containing ambient atmosphere.

In the herein-described preferred embodiment of the arc welding apparatus of the present invention, the electrode carriage assembly 46 includes a substantially flat, substantially vertically disposed plate 54. An L-shaped bracket 56, which directly carries the substantially upright standing electrode support assembly 52, is attached by a plurality of bolts 58 to the flat plate 54.

A switch-carrying plate or member 60 is fixedly attached, also by a plurality of bolts 62, to the flat plate 54. In alternative embodiments of the welding apparatus 20 of the present invention, the flat plate 54 and the switch-carrying member 60 may be of integral construction. The switch-carrying member 60 incorporates an electric switch 64, preferably a microswitch, and an adjusting screw 66, the function of which is described below in detail. The microswitch 64 is shown on FIGS. 3 and 5 and the adjusting screw 66 is shown on FIGS. 1, 2 and 4.

It is an important feature of the present invention that the electrode carriage assembly 46 is attached to the mounting bracket 30 in such a manner that the carriage assembly 46 occupies one of two principal positions relative to the bracket 30. The carriage assembly 46 is moved from a first position (shown on FIG. 2) to a second position when during downward travel of the carriage assembly 46 the electrode contacts the workpiece 34, and consequently the microswitch 64 is tripped. Stated differently, in accordance with the present invention, the electrode carriage assembly 46 is attached to the motor driven lead screw-threaded sleeve assembly 26 in such a manner that the electrode carriage assembly 46 normally occupies a first position relative to the lead screw-threaded sleeve assembly 26. In said first position the microswitch 64 is maintained in a first state. However, when during travel of the electrode carriage assembly 46 towards the workpiece 34, the electrode 48 contacts the workpiece 36, the electrode carriage assembly 46 is moved into its second position and the microswitch 64 is tripped into a second state.

Referring now principally to FIGS. 2, 3, 4 and 5, the above-noted objective is shown to be accomplished by four (4) linkage arms 68 which interconnect the vertical plate 38 of the mounting bracket 30 with the flat plate 54 of the electrode carriage assembly 46. Each linkage arm 68 is mounted for at least limited pivoting motion relative to the vertical plate 38 and the flat plate 54. As is shown on FIGS. 2 and 4, the switch-carrying member 60 is disposed partially above the vertical plate 38. Under normal pull of gravity the entire electrode carriage assembly 46 is disposed as low as possible, i.e., in a position wherein the adjoining screw 66 contacts the vertical plate 38. This position, shown on FIG. 2, is the first position of the electrode carriage assembly 46. On FIG. 3, the microswitch 64 is shown to be in contact with the vertical plate 38 in the first position, so that the microswitch 64 is normally kept in its first state.

FIG. 4 shows the electrode carriage assembly 46 in the second position, which is reached in the following manner. After an appropriate action by an operator (not shown), an electronic control unit 70 energizes the electric motor 22 to drive the lead screw-threaded sleeve assembly 26 and the electrode carriage assembly 46 therewith towards the workpiece 34. When the electrode 48 physically contacts the workpiece 34, the carriage assembly 46 becomes incapable of further downward movement. However, the motor 22 momentarily still continues to drive the threaded sleeve 28 downward, so that the carriage assembly 46 slightly rises, and pivots relative to the mounting bracket 30. As this occurs, the distance between the microswitch 64 and the vertical plate 38 increases slightly so that the microswitch 64 no longer physically contacts the vertical plate 38. Thus, the microswitch 64 is tripped to occupy a second state. This is shown on FIG. 5.

The control unit 70 is electrically connected to the microswitch 64 so that it senses the tripping of the same. Thereupon, the control unit 70 energizes the electric motor 22 to rotate in an opposite direction for a predetermined period of time so as to move the electrode 48 a predetermined distance away from the workpiece 34. As is known in the art, the electric welding arc is initiated when the electrode 48 is disposed at the predetermined distance from the workpiece 34. Since the electronic control unit 70, used in conjunction with the present invention, may be built in accordance with standard practice in the art, it is not deemed necessary to disclose its structure in detail. A control unit 70 particularly adapted for use in conjunction with the present invention and also having certain novel features is disclosed in a copending application for U.S. patent. The specification of this copending application, which is tilted "Improved Arc Voltage Control Circuit," having Ser. No. 372,194 filed Apr. 26, 1982, is hereby expressly incorporated by reference.

Since rotation of the electric motor 22 is reversed substantially instantaneously with the contact of the electrode 48 with the workpiece 34, the welding apparatus 20 of the present invention operates very accurately and reliably to set the electrode 48 the precise predetermined distance from the workpiece 34. As it should be apparent from the foregoing, after the electrode 48 contacts the workpiece 34, the weight of the electrode carriage assembly 46 is momentarily supported by the workpiece 34 so that the ensuing slight downward travel of the threaded sleeve 28 (until the microswitch is tripped) does not tend to push the electrode 48 into the workpiece 34.

The electric motor 22 utilized in the arc welding apparatus of the present invention is preferably a D.C. motor, so that its rotation is readily reversed by simple reversal of polarity of the current supply to the motor 22. However, a suitable, reversible A.C. powered motor can also be used in the present invention.

The adjusting screw 66, which determines the precise positioning of the electrode carriage assembly 46 in the first position thereof, is preferably recessed in the switch-carrying member 60 as is shown on FIG. 1. However, it can be readily adjusted by use of an Alan wrench (not shown) or like tool.

Several modifications of the above-described arc welding apparatus may become readily apparent to those skilled in the art in light of the above disclosure. Therefore, the scope of the present invention should be interpreted solely from the following claims.

What is claimed is:

1. A welding apparatus comprising:
   a motor capable of providing a rotational power output in either direction;
   translatory motion means operatively connected with the motor and driven thereby for moving in either direction towards or away from a workpiece, the direction of movement of the translatory motion means being dependent on the direction of rotational power output of the motor;
   electrode-carrying means adapted for carrying a welding electrode capable of being coupled to a power source to provide an electric arc between the electrode and the workpiece, the electrode-carrying means being carried by the translatory motion means to travel therewith towards or away from the workpiece;
   mounting means operatively associated with the electrode-carrying means and with the translatory motion means for normally maintaining the electrode-carrying means in a first position relative to the translatory motion means and for allowing the electrode-carrying means to move into a second position relative to the translatory motion means when the translatory motion means are carrying the electrode-carrying means towards the workpiece and the workpiece is physically contacted by the electrode;
   said mounting means being adapted for mounting the electrode-carrying means to the translatory motion means for a limited pivotable motion relative thereto, the electrode-carrying means being gravity biased to the first position, and comprising a plurality of linkage arms, each linkage arm being mounted to the translatory motion means for at least limited pivoting motion relative thereto and to the electrode-carrying means for at least limited pivoting motion relative thereto, whereby the electrode-carrying means are capable of limited pivoting motion relative to the translatory motion means, and whereby the first position of the electrode-carrying means is an extreme pivotable position allowed by the mounting means which the electrode-carrying means are gravity biased to occupy; and
   switch and control means operatively associated with the electrode-carrying means for being tripped when the electrode-carrying means are moved from the first position to the second position and for reversing the rotational power output of the motor for a predetermined time period after the switch means are tripped.

2. The apparatus of claim 1 wherein the switch means are fixedly mounted to the electrode-carrying means, wherein the translatory motion means include a member in permanent contact with the switch means while the electrode-carrying means are in the first position, and wherein the member is moved away from contact with the switch means when the electrode-carrying means are moved from the first position to the second position, whereby the switch means are tripped.

3. The apparatus of claim 1 wherein the translatory motion means comprise a lead screw-threaded sleeve assembly.

4. The apparatus of claim 3 wherein the translatory motion means further comprise a mounting plate fixedly attached to the sleeve of lead screw-threaded sleeve assembly, the linkage arms being attached to the mounting plate.

5. The apparatus of claim 1 wherein the electric motor is a D.C. motor and wherein the switch and control means comprise means for reversing polarity of current supplied to the motor to reverse the rotation of the motor.

6. A welding apparatus comprising:
a reversible D.C. electric motor capable of providing a rotational power output in either direction;
a lead screw-threaded sleeve assembly coupled to the electric motor and driven thereby and including a rotatably mounted lead screw rotated by the electric motor, and a threaded sleeve mounted upon the lead screw to move lineally along the longitudinal axis of the lead screw, the direction of lineal movement of the sleeve being dependent on the direction of rotation of the electric motor;
electrode-carrying means adapted for fixedly mounting a welding electrode connectable to a suitable power supply to create an electric welding arc between the electrode and a workpiece;
mounting means for mounting the electrode-carrying means to the sleeve to occupy two extreme positions thereon, the first extreme position of electrode-carrying means relative to the sleeve being its normal resting position whereto the electrode-carrying means are biased by gravity, the second extreme position of the electrode-carrying means relative to the sleeve being a position whereto the electrode-carrying means are moved when the sleeve under the power of the electric motor continues to move towards the workpiece and the electrode-carrying means are prevented from further movement due to physical contact with the workpiece;
said mounting means including a mounting plate fixedly attached to the sleeve, and a plurality of linkage arms, each of the linkage arms being mounted to the mounting plate for at least limited pivoting motion relative thereto and being mounted to the electrode-carrying means for at least limited pivoting motion relative thereto, whereby the first and second positions of the electrode-carrying means relative to the sleeve are pivoting positions relative thereto; and
switch and control means including an electric switch for controlling the direction of rotation of the electric motor by controlling the polarity of the current supplied to the motor, the electric switch being operatively associated with the electrode-carrying means for being tripped when the electrode-carrying means move from the first position to the second position, tripping of the switch causing the switch and control means to reverse for a predetermined time period the rotation of the motor, whereby after the electrode physically contacts the workpiece the electrode is carried a predetermined distance away from the workpiece.

7. The apparatus of claim 6 wherein the electric switch is fixedly attached to the electrode-carrying means and in the first position is continuously in contact with the mounting plate and wherein in the second position of the electrode-carrying means the electric switch is no longer in contact with the mounting plate whereby the electrod switch is tripped.

8. The apparatus of claim 7 further comprising adjusting means for adjusting the pivotable distance between the first and second positions of the electrode-carrying means.

9. In an arc welding apparatus having a motor for providing a rotational power output in either direction, translatory motion means for converting the rotational power output of the motor into lineal motion for carrying a welding electrode towards or away from a workpiece depending on the direction of the rotational power output of the motor, electrode-carrying means for mounting the electrode, and control and switch means for controlling the rotation of the electric motor, the improvement comprising:
means for mounting the electrode-carrying means to the translatory motion means to occupy two positions thereon, the electrode-carrying means occupying the first position when the electrode is not in contact with the workpiece, and the electrode-carrying means occupying the second position substantially instantaneously after the electrode comes into physical contact with the workpiece as the electrode is carried towards the workpiece;
said means for mounting comprising a plurality of linkage arms, each linkage arm being mounted to the translatory motion means for at least limited pivoting motion relative thereto and also to the electrode-carrying means for at least limited pivoting motion relative thereto, the first position of the electrode-carrying means relative to the translatory motion means being a gravity biased position; and
electric switch means included in the switch and control means and adapted for being tripped when the electrode-carrying means moves from the first position to the second position, and for reversing for a predetermined time the direction of the rotational power output of the motor whereby after physical contact with the workpiece the electrode is carried to a predetermined distance away from the workpiece.

10. The improvement of claim 9 wherein the switch means are mounted to the electrode-carrying means.

11. The improvement of claim 10 wherein the translatory motion means include a linkage arm-carrying member, wherein the switch means are in physical contact with the member while the electrode-carrying means are in the first position, and wherein the switch means are not in physical contact with the member while the electrode-carrying means are in the second position, whereby the switch means are tripped as the electrode-carrying means move from the first position to the second position.

12. The improvement of claim 11 wherein the motor is a D.C. motor and wherein the switch and control means are adapted for reversing the polarity of current supplied to the motor to reverse rotation of the motor.

13. In an arc welding apparatus having a reversible electric motor for providing a rotational power output in either direction, a lead screw and threaded sleeve assembly connected to and driven by the electric motor, said assembly comprising means for converting rotary motion of the motor into lineal motion of the threaded sleeve, the direction of said lineal motion being dependent on the direction of rotation of the electric motor, electrode-carrying means for carrying a welding electrode adapted for connection to a power source for creating an arc between the electrode and a workpiece, and switch and control means for controlling rotation of the electric motor, the improvement comprising:

a member fixedly attached to the sleeve to lineally move therewith;

a plurality of linkage arms comprising means for mounting the electrode-carrying means to the member for limited pivoting motion relative thereto and for providing a first relative position of the electrode-carrying means to the member, and a second relative position of the electrode-carrying means to the member, and electric switch means comprising part of the switch and control means and mounted to the electrode-carrying means, the switch means being adapted for being tripped when the electrode-carrying means is moved from the first position to the second position, and for reversing rotation of the motor upon being tripped, the first position of the electrode-carrying means being a gravity biased position, and the second position being a position whereto the electrode-carrying means are pushed against the force of gravity when the electrode physically encounters the workpiece during its motion toward the workpiece.

14. The improvement of claim 13 wherein the electric switch means are continuously in physical contact with the member in the first position of the electrode-carrying means, and wherein the electric switch means are not in physical contact with the member in the second position of the electrode-carrying means.

15. The improvement of claim 13 wherein the electric motor is a D.C. motor and the switch and control means are adapted for reversing polarity of current supplied to the motor upon the switch means being tripped.

16. The improvement of claim 13 further comprising adjusting means associated with the electrode-carrying means and the member for adjusting a distance travelled by the electrode-carrying means between the first position and the second position.

* * * * *